United States Patent [19]

Quinlan

[11] 4,064,044

[45] Dec. 20, 1977

[54] PROCESS FOR CHELATING AND INHIBITING SCALE IN AQUEOUS SYSTEMS

[75] Inventor: Patrick M. Quinlan, Webster Groves, Mo.

[73] Assignee: Petrolite Corporation, St. Louis, Mo.

[21] Appl. No.: 679,390

[22] Filed: Apr. 22, 1976

Related U.S. Application Data

[62] Division of Ser. No. 160,106, July 6, 1971, abandoned.

[51] Int. Cl.$^2$ ............................ C02B 1/26; C23F 11/16
[52] U.S. Cl. ...................................... 210/58; 21/2.7 A
[58] Field of Search ............... 21/2.7 A; 210/54, 58, 210/59; 252/180, 181, 389 A; 260/72 R, 502.5

[56] References Cited

U.S. PATENT DOCUMENTS

| | | | |
|---|---|---|---|
| 2,652,367 | 9/1953 | Adelson | 260/72 |
| 2,841,611 | 7/1958 | Bersworth | 260/500 |
| 3,296,301 | 1/1967 | Nielsen | 260/502.5 |
| 3,519,559 | 7/1970 | Quinlan | 210/54 |
| 3,535,278 | 10/1970 | Oertel et al. | 260/72 |
| 3,617,578 | 11/1971 | Stanford | 252/180 |
| 3,619,427 | 11/1971 | Kautsky | 210/58 |
| 3,658,791 | 4/1972 | Tesoro | 260/72 |
| 3,714,067 | 1/1973 | King et al. | 260/502.5 |
| 3,751,371 | 8/1973 | Redmore et al. | 252/175 |
| 3,792,084 | 2/1974 | Quinlan | 210/58 |
| 3,867,286 | 2/1975 | Quinlan | 210/58 |
| 3,926,801 | 12/1975 | Quinlan | 210/58 |
| 4,012,440 | 3/1977 | Quinlan | 210/58 |

*Primary Examiner*—Wilbur L. Bascomb, Jr.
*Assistant Examiner*—Peter A. Hruskoci
*Attorney, Agent, or Firm*—Sidney B. Ring; Hyman F. Glass

[57] ABSTRACT

Methylene phosphonates of polyalkylenepolyamines polymerized with chain extenders such as epoxyhalides, dihalides, etc., such as epihalohydrin, alkylenedihalide, alkenylenedihalide, alkynylenedihalide, xylylenedihalide, alkyleneetherdihalides, etc.; and to uses therefor, particularly as scale inhibitors, chelating agents, etc.

12 Claims, No Drawings

PROCESS FOR CHELATING AND INHIBITING SCALE IN AQUEOUS SYSTEMS

This application is a Divsion of appication Ser. No. 160,106, filed July 6, 1971, now abandoned by Patrick M. Quinlan. Reference is made to application Ser. No. 679,389, filed Apr. 22, 1976, entitled "Methylene phosphonates of polymerized polyalkylenepolyamines," filed by Patrick M. Quinlan.

Most commercial water contains alkaline earth metal cations, such as calcium, barium, magnesium, etc., and anions such as bicarbonate, carbonate, sulfate, oxalate, phosphate, silicate, fluoride, etc. When combinations of these anions and cations are present in concentrations which exceed the solubility of their reaction products, precipitates form until their product solubility concentrations are no longer exceeded. For example, when the concentrations of calcium ion and carbonate ion exceed the solubility of the calcium carbonate reaction product, a solid phase of calcium carbonate will form as a precipitate.

Solubility product concentrations are exceeded for various reasons, such as evaporation of the water phase, change in pH, pressure or temperature, and the introduction of additional ions which can form insoluble compounds with the ions already present in the solution.

As these reaction products precipitate on the surfaces of the water-carrying system, they form scale. The scale prevents effective heat transfer, interferes with fluid flow, facilitates corrosive processes, and harbors bacteria. Scale is an expensive problem in many industrial water systems, causing delays and shutdowns for cleaning and removal.

Scale-forming compounds can be prevented from precipitating by inactivating their cations with chelating of sequestering agents, so that the solubility of their reaction products is not exceeded. Generally, this approach requires many times as much chelating or sequestering agent as cation present, and the use of large amounts of treating agent is seldom desirable or economical.

More than 25 years ago it was discovered that certain inorganic polyphosphates would prevent such precipitation when added in amounts far less than the concentrations needed for sequestering or chelating. See, for example, Hatch and Rice, "Industrial Engineering Chemistry," vol. 31, p. 51, at 53; Reitemeier and Buchrer, "Journal of Physical Chemistry," vol. 44, No. 5, p. 535 at 536 (May 1940); Fink and Richardson U.S. Pat. No. 2,358,222; and Hatch U.S. Pat. No. 2,539,305. When a precipitation inhibitor is present in a potentially scale-forming system at a markedly lower concentration than that required for sequestering the scale forming cation, it is said to be present in "threshold" amounts. Generally, sequestering takes place at a weight ratio of threshold active compound to scale-forming cation component of greater than about ten to one, and threshold inhibition generally takes place at a weight ratio of threshold active compound to scale-forming cation component of less than about 0.5 to 1.

The "threshold" concentration range can be demonstrated in the following manner. When a typical scale-forming solution containing the cation of a relatively insoluble compound is added to a solution containing the anion of the relatively insoluble compound and a very small amount of a threshold active inhibitor, the relatively insoluble compound will not precipitate even when its normal equilibrium concentration has been exceeded. If more of the threshold active compound is added, a concentration is reached where turbidity or a precipitate of uncertain composition results. As still more of the threshold active compound is added, the solution again becomes clear. This is due to the fact that threshold active compounds in high concentrations also act as sequestering agents, although sequestering agents are not necessarily threshold compounds. Thus, there is an intermediate zone between the high concentrations at which threshold active compounds sequester the cations of relatively insoluble compounds and the low concentrations at which they act as threshold inhibitors. Therefore, one could also define threshold concentrations as all concentrations of threshold active compounds below that concentration at which turbid zone or precipitate is formed. Generally the threshold active compound will be used in a weight ratio of the compound to the cation component of the scale-forming salts which does not exceed about 1.

The polyphosphates are generally effective threshold inhibitors for many scale-forming compounds at temperatures below 100° F. But after prolonged periods at higher temperatures, they lose some of their effectiveness. Moreover, in an acid solution, they revert to ineffective or less effective compounds, I have now discovered a process for inhibiting scale such as calcium, barium and magnesium carbonate, sulfate, silicate, etc., scale which comprises employing threshold amounts of methylene phosphonates of polyalkylenepolyamines polymerized with epoxyhalides or dihalides These products are the reaction products of (1) polyalkylene polyamines and related compounds with (2) polyfunctional compounds, preferably bifunctional, capable of yielding upon reaction (3) a polymer having controlled crosslinking so that the polymer is soluble and/or disperable in an aqueous system, and then reacting this polymer with a phosphomethylolating agent to yield (4) methylene phosphonates of polymerized polyalkylenepolyamines.

These reactions may be summarized by the following idealized equations

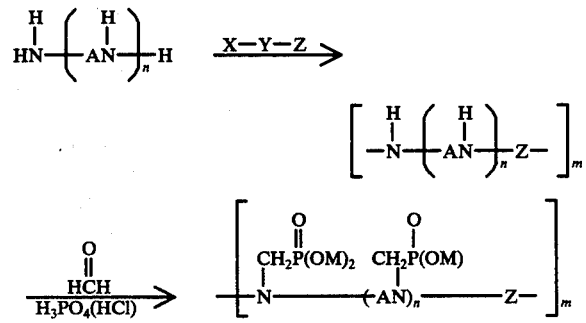

Also included within the scope of this invention are quaternized methylene phosphonates wherein one or more nitrogen group is quaternary.

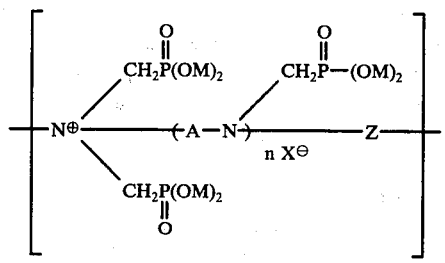

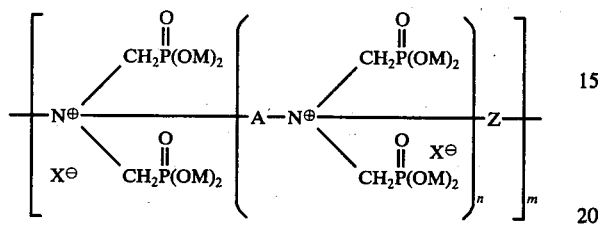

Stated another way, the formed polymers may be reacted with methylene phosphonate groups so that all or less than all of the N—H groups are reacted, or all N—H groups are reacted exhaustively to non-quaternary groups or all N—H groups can be fully exhausted so that one or more or all nitrogens are quaternized.

The object of the reaction of the bridging group Z with the polyalkyleneamine is to increase the molecular weight of the polyamine, with Z acting as a bridge between the polyamine groups.

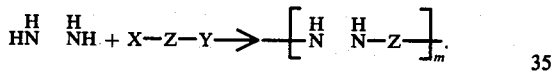

X—Z—Y may be any suitable compound capable of reacting with the polyamine to form the polymer. For example, X and Y may be halogen, epoxy, etc. In addition, X and Y may be the same or different; for example, X and Y may both be halogen, may both be epoxy, one may be halogen and the other epoxy, etc. The following are typical examples.

Epihalohydrin

Any suitable epihalohydrin may be reacted. Epichlorohydrin is preferred. Other epichlorohydrin compounds include:

1,2-epoxy-4-chlorobutane,
2,3-epoxy-4-chlorobutane,
1,2-epoxy-5-chloropentane,
2,3-epoxy-5-chloropentane, etc.

In general the chloro derivatives are preferred, although the corresponding bromo, iodo, etc., compounds may be employed. In some cases, epidichlorohydrin compounds may be utilized. Mixtures of epihalohydrins may also be employed.

X—Z—Y may be a wide variety of polymerizing compounds where Z may be alkylene, alkenylene, alkynylene, alkaralkylene, an alkyleneether-containing group, an ester-containing group, an amido-containing group, etc.

The following are non-limiting examples:

I. Saturated dihalides

X—X—X 

where Z is alkylene, straight chain or branched, for example X(CH$_2$)$_n$X where n is 2-25 or more, for example 2-10, but preferably 2-4. The —CH$_{2n}$ may be branched such as where at least one of the H's is a hydrocarbon group such as alkyl, i.e., methyl, ethyl, etc., substituted such as halo, hydroxy, etc.

II. Aralkylene dihalides

X—Z—X 

where Z is aralkylene having for example 8-30 or more carbons, such as 8-20 carbons, but preferably xylylene. The following are illustrative examples:

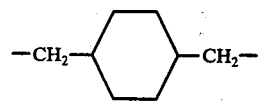

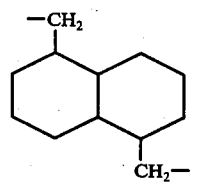

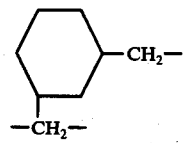

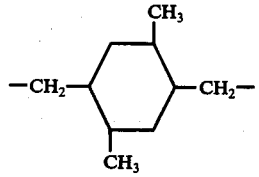

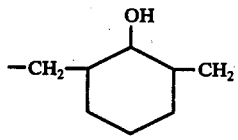

Additional examples of aralkylene radicals include those of the formula —CH$_2$—Ar—CH$_2$— where Ar is

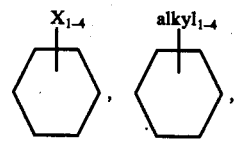

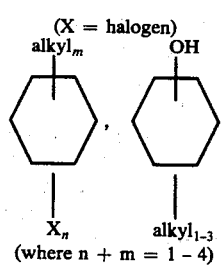

(where n + m = 1 - 4)

-continued

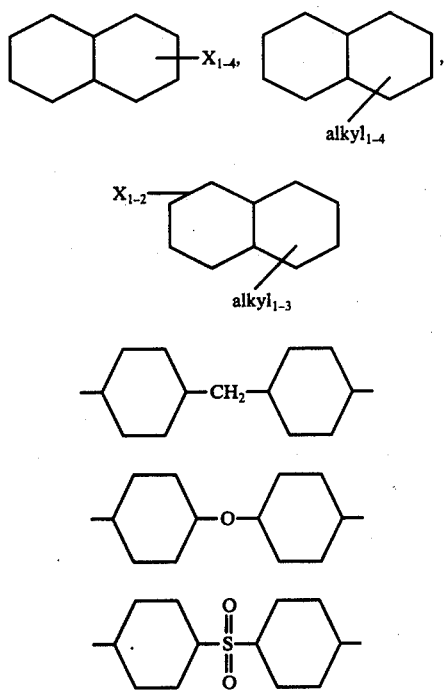

III. Alkylene Ethers

X—A—X where A is an alkyleneether radical —A(OA)$_n$— where A is alkylene (including cycloalkylene ether radicals) having for example from 1-10 or more carbons such as 1-4, but preferably 2 in each alkylene unit. Typical examples are Cl—CH$_2$CH$_2$—O—CH$_2$CH$_2$—Cl Cl—CH$_2$CH$_2$(O CH$_2$CH$_2$)$_{\overline{1-10}}$Cl

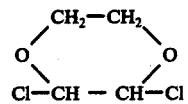

Cl—CH$_2$CH$_2$ O—CH$_2$ O—CH$_2$CH$_2$—Cl

Additional examples of A include groups of the formula (AO)$_n$ where

where Y is alkyl, for example

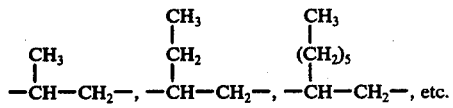

Thus, A can be methylene, polymethylene, ethylene, propylene, butylene, octylene, etc. In addition, (AO)$_n$ may be homo or hetero as to A, to yield for example (ETO)$_a$(PRO)$_b$, (PrO)$_a$(BuO)$_b$, or (PrO—ETO)$_n$;

—CH$_3$OCH$_2$CH$_2$OCH$_2$CH$_3$OCH$_2$— etc.

These compounds also include the formal of ethylene chlorohydrin and bromohydrin, for example, ClCH$_2$CH$_2$OCH$_2$OCH$_2$CH$_2$Cl, ClCH$_2$CH$_2$OCH$_2$CH$_2$OCH$_2$OCH$_2$CH$_2$OCH$_2$CH$_2$Cl etc.

IV. Unsaturated dihalides

X—Z—X where Z is an unsaturated aliphatic radical, for example —CH$_2$—CH=CH—CH$_2$—, —CH$_2$—C≡C—CH$_2$—, etc.

The amines employed herein are polyalkylene polyamines, for example, of the formula

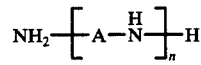

where $n$ is an integer, for example, 1 to 25 or more, such as 2 to 10, but preferably 2 to 5, etc., and A is an alkylene group —(CH$_2$)$_m$— where $m$ is 2 to 10 or more, but preferably ethylene or propylene.

One or more of the hydrogens on the CH$_2$ group may be substituted, for example, by such groups as alkyl groups, for example, methyl, ethyl, etc. Examples of A include

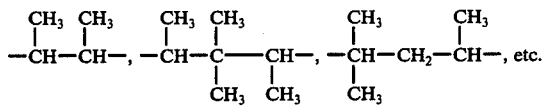

Examples of polyamines include the following: diethylene triamine, dipropylene triamine, triethylene tetramine, tripropylene tetramine, tetraethylene pentamine, tetrapropylene pentamine, polyalkyleneimines, i.e., the higher molecular weight amines derived from alkylenimine such as polyethyleneimines, polypropyleneimines, for example, having 50, 100 or more alkylene amino units, etc. Mixtures of the above polyamine amines and those polyamines containing both ethylene and propylene groups, for example:

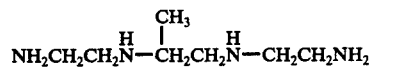

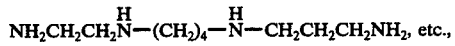

can be employed

These include the following :

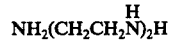

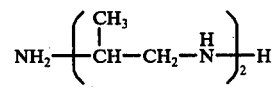

-continued

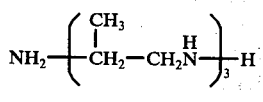

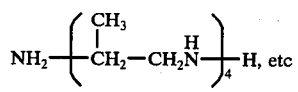

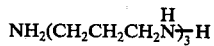

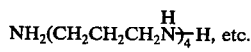

In addition, the starting polyamine may be of a technical grade such as "Amine E-100" from Dow Chemical Company. Amine E-100 is the still bottoms from a polyalkylene polyamine process with the following approximate composition:

|  | Percent |
| --- | --- |
| Tetraethylene pentamine (H$_2$N(CH$_2$CH$_2$N—H)$_4$H) | 10 |
| Pentaethylene hexamine (H$_2$N(CH$_2$CH$_2$NH)$_5$H) | 40 |
| Cyclics (piperazines) | 20 |
| Branched structure | 20 |
| Polymers (chains with more than five ethylene amine groups | 10 |

Other suitable amines are the polyethyleneimine series from Dow Chemical Company.

Also included within the terms polyalkylene polyamine are substituted polyamines such as N-alkyl, N-aryl, etc., compositions

provided some groups are present capable of forming methylene phosphonates.

Illustrative examples are

where R is alkyl, aryl, alkenyl, etc., such as hexyl, dodecyl, etc.

Also included are acylated polyalkylenepolyamines such as alkyl, aryl, alkenyl, etc., for example, where

is a acetyl, benzoic, etc.

The following equation illustrates the reaction of epichlorohydrin with polyethylenepolyamines, ideally presented

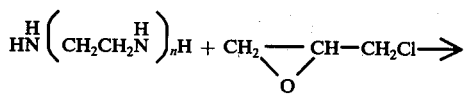

-continued

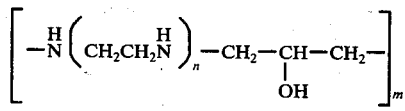

The above is an idealized presentation, but the inventor does not exclude other related reactions such as certain amounts of crosslinking, etc.

The reaction with dichlorodiethyl ether may be ideally presented as follows:

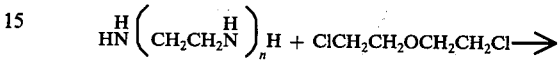

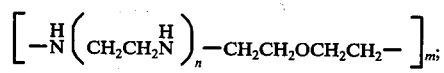

with alkylene dichlorides the reaction is

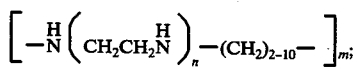

with butene dichloride the reaction is

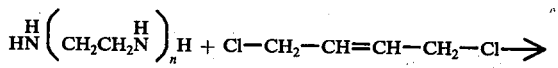

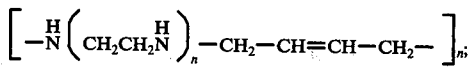

with butyne dichloride the reaction is

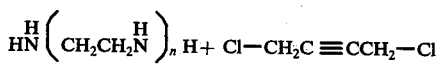

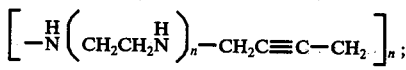

with aralkylarylene the reaction is

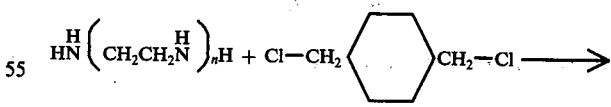

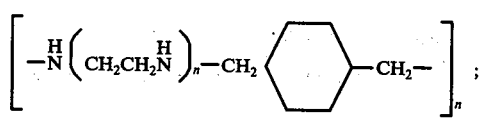

In order to minimize crosslinking it is advisable to react substantially equal molar or less amounts of polyalkylene polyamines and chain extender X-Z-Y.

The polymerized polyalkylenepolyamines are then phosphomethylolated. This is preferably carried out by the Mannich reaction as illustrated in the following reaction where —NH indicates at least one reactive group on the polyamine

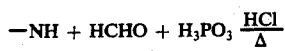

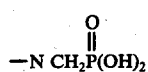

The Mannich reaction is quite exothermic and initial cooling with generally be required. Once the reaction is well under way, heat may be required to maintain refluxing conditions. While the reaction will proceed at temperatures over a wide range, i.e., from 80° to 150° C., it is preferred that the temperatures of the reaction medium be maintained at the refluxing temperatures. The reaction is preferably conducted at atmospheric pressure, although sub-atmospheric and superatmospheric pressures may be utilized if desired. Reaction times will vary, depending upon a number of variables, but the preferred reaction time is 1 to 5 hours, and the most preferred reaction time is 2½ to 3½ hours.

Although the phosphonic acid or the formaldehyde may be added in either order, or together to the reaction mixture, it is preferred to add the phosphonic acid to the polymerized polyalkylenepolyamine and then to slowly add the formaldehyde under refluxing conditions. Generally, about ½ to 10 moles or more of formaldehyde and about ½ to 10 moles or more of phosphonic acid can be used per mole equivalent of amine, although the most preferred molar equivalent ratios of formaldehyde: phosphonic acid: amine is 1:1:1. Excess formaldehyde and/or phosphonic acid function essentially as solvents, and thus there is no real upper limit on the amount of these materials which may be used, per mole equivalent of amine, although such excess amounts naturally add to the cost of the final product and are therefore not preferred. The preferred molar equivalent ratios are ½ to 2 moles each of the formaldehyde and phosphonic acid per mole equivalent of amine.

The Mannich reaction will proceed in the presence or the absence of solvents. The reaction may be carried out as a liquid-phase reaction in the absence of solvents or diluents, but is preferred that the reaction be carried out in an aqueous solution containing from about 40 to about 50% of the reaction monomers. Preferred conditions for the Mannich reaction include the use of formaldehyde based on the molar equivalent amount of the amine compound, the use of a stoichiometric amount of phosphonic acid based on the molar equivalent amount of amine (e.g., on the amine active hydrogen content), refluxing conditions and a pH of less than 2 and preferably less than 1.

Although formaldehyde is preferred, other aldehydes or ketones may be employed in place of formaldehyde such as those of the formula $$R-\underset{\underset{R'}{|}}{C}=O$$

where R + R' are hydrogen, or a hydrocarbon group such as alkyl, i.e., methyl, ethyl, propyl, butyl, etc., aryl, i.e., phenyl, alkylphenyl, phenalkyl, etc., cycloalkyl, i.e., cyclohexyl, etc.

The compound can also be prepared by a modified Mannich reaction by employing a chloromethylene phosphonate.

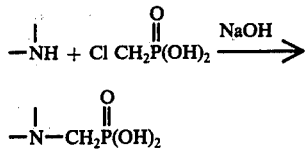

The compositions of this invention may be illustrated by the following formulas:

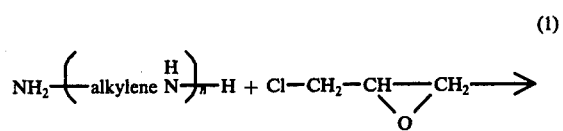

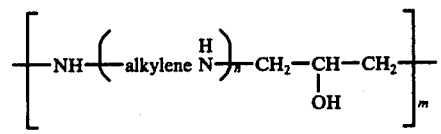

polyalkylene-polyamine-epichlorohydrin condensate

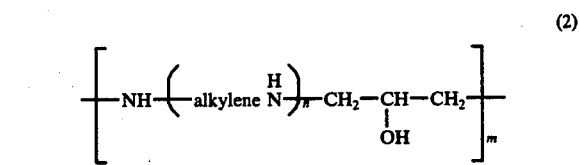

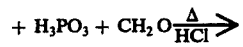

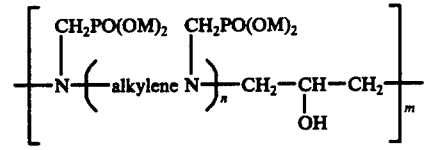

methylene phosphonic acid adduct of polyalkylene-polyamine-epichlorohydrin condensate.

n = 1 - 15 but preferably 1 - 5
m = 1 - 25 but preferably 1 - 10
M - alkali metal, hydrogen, alkyl ammonium and ammonium.

EXAMPLE 1

To a 57 g. of tetraethylenepentamine was added 57 g. of water, and the mixture was heated to 80° C., 28 g. of epichlorohydrin was added, dropwise, with stirring. The addition was completed within 1½ hours. The resulting solution was then stirred and heated at 90° - 100° C. for 2 hours. 28 g. of water was then added to bring the concentration of resin to 50%.

To a solution of 49 g. of phosphorous acid, 49 g. of water and 67 g. of 37% hydrochloric acid was slowly added, with external cooling and stirring, 56 g. of the polyamine resin solution described above. The resulting solution was heated to reflux, and 61 g. of 37% aqueous formaldehyde solution was added, dropwise, over a period of one hour. After the addition had been completed, the reaction mixture was held at reflux for two additional hours.

EXAMPLE 2

In a similar manner, 59 g. of triethylenetetramine was condensed with 37 g. of epichlorohydrin in 96 g. of water.

To a solution of 41 g. of phosphorous acid, 41 g. of water and 59 g. of 37% hydrochloric acid was slowly added, with external cooling and stirring, 48 g. of the polyamine resin solution described above. The resulting solution was heated to reflux, and 45 g. of 37% aqueous formaldehyde solution was added, dropwise, over a period of 1 hour. After the addition had been completed, the reaction mixture was held at reflux for 2 additional hours.

EXAMPLE 3

In a similar manner, 52 g. of diethylenetriamine was condensed with 46 g. of epichlorohydrin in 98 g. of water.

To a solution of 41 g. of phosphorous acid, 41 g. of water and 59 g. of 37% hydrochloric acid was slowly added, with cooling and stirring, 49 g. of the polyamine resin solution described above. The resulting solution was heated to reflux, and 44 g. of 37% aqueous formaldehyde solution was added dropwise, over a period of 1 hour. After the addition had been completed, the reaction mixture was held at reflux for 2 additional hours.

EXAMPLE 4

In a similar manner, 52 g. of diethylenetriamine was condensed with 23 g. of epichlorohydrin in 75 g. of water.

To a solution of 46 g. of phosphorous acid, 46 g. of water and 62 g. of 37% hydrochloric acid was slowly added, with cooling and stirring, 49 g. of the polyamine resin solution described above. The resulting solution was heated to reflux, and 49 g. of 37% aqueous formaldehyde solution was added, dropwise, over a 1 hour period. After the addition had been completed, the reaction mixture was held at reflux for 2 additional hours.

EXAMPLE 5

In a similar manner, 100 g. of Amine E-100 (Dow Chemical Company) was condensed with 46 g. of epichlorohydrin in 146 g. of water.

To a solution of 62 g. of phosphorous acid, 62 g. of water and 80 g. of 37% hydrochloric acid was slowly added, with external cooling and stirring, 72 g. of the polyamine resin solution described above. The resulting solution was heated to reflux, and 61 g. of 37% aqueous formaldehyde solution was added, dropwise, over a period of 1 hour. After the addition had been completed, the reaction mixture was held at reflux for 2 additional hours. A portion of the product was neutralized with 50% sodium hydroxide.

EXAMPLE 6

In a similar manner, 100 g. of Amine E-100 was condensed with 23 g. of epichlorohydrin in 123 g. of water.

To a solution of 66 g. of phosphorous acid, 66 g. of water and 79 g. of 37% hydrochloric acid was slowly added, with external cooling and stirring, 62 g. of the polyamine resin solution described above. The resulting solution was heated to reflux, and 65 g. of 37% aqueous formaldehyde solution was added, dropwise, over a period of 1 hour. After the addition had been completed, the reaction mixture was held at reflux for 2 additional hours. A portion of the product was neutralized with 50% sodium hydroxide.

EXAMPLE 7

In similar manner, 57 g. of tetraethylenepentamine was condensed with 18 g. of 1,4-dichlorobutene-2 in 75 g. of water.

To a solution of 56 g. of phosphorous acid, 46 g. of water and 65 g. of 37% hydrochloric acid was slowly added, with external cooling and stirring, 53 g. of the polyamine resin solution described above. The resulting solution was heated to reflux, and 60 g. of 37% aqueous formaldehyde solution was added, dropwise, over a period of 1 hour. After the addition had been completed, the reaction mixture was held at reflux for 2 additional hours.

EXAMPLE 8

In a similar manner, 100 g. of Amine E-100 was reacted with 28 g. of dichloroethyl ether in 128 g. of water.

To a solution of 65 g. of phosphorous acid, 65 g. of water and 77 g. of 37% hydrochloric acid was slowly added, with external cooling and stirring, 60 g. of the polyamine resin solution described above. The resulting solution was heated to reflux, and 63 g. of 37% aqueous formaldehyde solution was added, dropwise, over a period of 1 hour. After the addition had been completed, the reaction mixture was held at reflux for 2 additional hours.

EXAMPLE 9

Example 8 was reacted employing $ClCH_2CH=CH\ CH_2Cl$ to obtain the analogous product.

EXAMPLE 10

Example 8 is repeated with

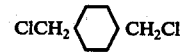

to obtain analogous product.

EXAMPLE 11

Example 8 is repeated with $ClCH_2C\equiv C-CH_2Cl$ to obtain the analogous product.

USE AS SCALE INHIBITOR

Scale formation from aqueous solutions containing an oxide variety of scale forming compounds,c such as calcium, barium and magnesium carbonate, sulfate, silicate, oxalates, phosphates, hydroxides, fluorides and the like are inhibited by the use of threshold amount of the compositions of this invention which are effective in small amounts, such as less than 100 ppm, and are preferably used in concentrations of less than 25 ppm.

The compounds of the present invention (e.g., the acid form of the compounds) may be readily converted into the corresponding alkali metal, ammonium or alkaline earth metal salts by replacing at least half of the hydrogen ions in the phosphonic acid group with the appropriate ions, such as the potassium ion or ammonium or with alkaline earth metal ions which may be converted into the corresponding sodium salt by the addition of sodium hydroxide. It the pH of the amine compound is adjusted to 7.0 by the addition of caustic soda, about one half of the —OH radicals on the phosphorous atoms will be converted into the sodium salt form.

The scale inhibitors of the present invention illustrate improved inhibiting effect at high temperature when compared to prior art compounds. The compounds of the present invention will inhibit the deposition of scale-forming alkaline earth metal compounds on a surface in contact with aqueous solution of the alkaline earth metal compounds over a wide temperature range. Generally, the temperatures of the aqueous solution will be at least 40° F., although significantly lower temperatures will often be encountered. The preferred temperature range for inhibition of scale deposition is from about 130° to about 350° F. The aqueous solutions or brines requiring treatment generally contain about 50 ppm to about 50,000 ppm of scale-forming salts. The compounds of the present invention effectively inhibit scale formation when present in an amount of from 0.1 to about 100 ppm, and preferably 0.2 to 25 ppm wherein the amounts of the inhibitor are based upon the total aqueous system. There does not appear to be a concentration below which the compounds of the present invention are totally ineffective. A very small amount of the scale inhibitor is effective to a correspondingly limited degree, and the threshold effect is obtained with less than 0.1 ppm. There is no reason to believe that this is the minimum effective concentrative. The scale inhibitors of the present invention are effective in both brine, such as sea water, and acid solutions.

In the specific examples the general method of phosphomethylolation is that disclosed in Netherlands Pat. Nos. 6,407,908 and 6,505,237 and in the Journal of Organic Chemistry, Vol. 31, No. 5, 1603–1607 (May, 1966). These references are hereby incorporated by reference.

In general, the method consists of the following: The polymerized polyalkylenepolyamine is slowly added with cooling to the mixture of phosphonic and hydrochloric acids. After the addition is completed, the reaction mixture is heated to 100°–110° C. and the aqueous formaldehyde is slowly added over a period of 1 to 1½ hours while maintaining a temperature of 100° – 110°. After the addition is completed, the reaction mixture is held at reflux temperatures for 1 to 2 additional hours. The preferred molar equivalent ratios are ½ to 2 moles each of the formaldehyde and phosphonic acid per mole equivalent of amine, although the most preferred molar equivalent ratios of formaldehyde: phosphonic acid: amine is 1:1:1.

Calcium Scale Inhibition Test

The procedure utilized to determine the effectiveness of my scale inhibitors in regards to calcium scale is as follows:

Several 50 ml. samples of a 0.04 sodium bicarbonate solution are placed in 100 ml. bottles. To these solutions is added the inhibitor in various known concentrations. 50 ml. samples of a 0.02 M CaCl$_2$ solution are then added.

A total hardness determination is then made on the 50—50 mixture utilizing the well known Schwarzenbach titration. The samples are placed in a water bath and heated at 180° F. 10 ml. samples are taken from each bottle at 2 and 4 hour periods. These samples are filtered through millipore filters and the total hardness of the filtrates are determined by titration.

$$\frac{\text{Total hardness after heating}}{\text{Total hardness before heating}} \times 100 = \% \text{ inhibition}$$

Table I describes the scale inhibition test results obtained.

Table I

Inhibitor of Scale Formation from CaCO$_3$ Solution at 180° F. for Four Hours (200 ppm CaCO$_3$).

| Inhibitor | Salt | Conc. ppm | % Scale Inhibitor |
|---|---|---|---|
| Example 1 | H | 50 | 62 |
| " | H | 20 | 43 |
| " | Na | 50 | 53 |
| " | Na | 20 | 37 |
| Example 2 | H | 50 | 50 |
| " | H | 20 | 46 |
| " | Na | 50 | 46 |
| " | Na | 20 | 40 |
| Example 3 | H | 50 | 59 |
| " | H | 20 | 50 |
| " | Na | 50 | 58 |
| " | Na | 20 | 50 |
| Example 4 | H | 50 | 67 |
| " | H | 20 | 57 |
| " | Na | 50 | 61 |
| " | Na | 20 | 52 |
| Example 5 | H | 50 | 65 |
| " | H | 20 | 50 |
| " | Na | 50 | 50 |
| " | Na | 20 | 45 |
| Example 6 | H | 50 | 79 |
| " | H | 20 | 60 |
| " | Na | 50 | 67 |
| " | Na | 20 | 46 |
| Commercial organic phosphate inhibitor | Na | 50 | 40 |
| | Na | 20 | 35 |
| Commercial organic phosphate inhibitor | Na | 50 | 42 |
| | Na | 20 | 35 |

The salt moiety can vary widely to include any suitable metal, ammonia, amine, etc., cation such as an alkali metal, i.e., sodium, potassium, etc., a monoamine such as methyl amine, ethyl amine, etc., polyamines such as ethylene diamine, propylene diamine, the corresponding polyamines such as diethylene triamine, triethylene tetramines, etc.; alkanolamines such as ethanolamine, diethanolamine, propanolamines, etc.; cyclicamines such a piperidine, morpholine, etc. Thus, any salt moiety capable of carrying out this invention can be employed.

USE IN THE CHELATION OR SEQUESTRATION OF METAL IONS

The chelating or sequestering agents of the present invention are of wide utility such as when it becomes necessary to sequester or inhibit the precipitation of metal cations from aqueous solutions. Among their many uses are the following applications:

Soaps and detergents, textile processing, metal cleaning and scale removal, metal finishing and plating, rubber and plastics, industry, pulp and paper industry, oil-well treatment, chelation in biological systems.

An important function of these compounds is their ability to sequester $Fe^{+2}$. In secondary oil recovery by means of water floods, waters are frequently mixed on the surface prior to injection. Frequently these waters contain amounts of $Fe^{+2}$ and $H_2S$. If these incompatible waters are mixed, an FeS precipitate results which can plug the sand face of the injection well. Another of their functions is to prevent formation of gelatinous iron hydroxides in the well and in the effluent production waters.

To demonstrate the effectiveness of the methylene phosphonates of polymerized polyalkylenepolyamines in chelating $Fe^{+2}$, the following test procedure was utilized. Into a flask that contained a known concentration of the sequestering agent, and enough sodium hydroxide or hydrochloric acid to give the desired pH was placed a 100 ml. aqueous sample of ferrous ammonium sulfate (20 ppm of $Fe^{+2}$); after final pH adjustment the solution was allowed to remain at ambient temperatures for 48 hours. The solution was centrifuged for one hour to remove collodial iron hydroxide and an aliquot of the supernatant solution was analyzed by atomic absorption to determine the iron concentration.

The following table illustrates the ability of the sequestering agents of the present invention to sequester $Fe^{+2}$, as compared to the well known sequestering agent tetrasodium ethylenediamine tetra-acetate (EDTA).

TABLE II

| pH | Sequestering Agent (ppm) | Amount of iron Sequestered (ppm) |
|---|---|---|
| | Product Example | |
| 5 | 1 (50) | (12) |
| 5 | 2 (50) | (9) |
| 5 | 3 (50) | (7) |
| 5 | 6 (50) | (14) |
| 5 | EDTA (50) | (7) |
| 7 | 1 (50) | (12) |
| 7 | 2 (50) | (9) |
| 7 | 3 (50) | (7) |
| 7 | 6 (50) | (13) |
| 7 | EDTA (50) | (13) |
| 10 | 1 (150) | (9) |
| 10 | 2 (150) | (7) |
| 10 | 3 (150) | (6) |
| 10 | 6 (150) | (10) |
| 10 | EDTA (150) | (6) |

As one can observe from the preceding table, the sequestering agents of this invention are as effective, and in some cases superior, to EDTA when tested over a wide pH range.

The sequestering agents of this invention are also quite effective in sequestering other metal cations in aqueous solutions. For example, a test was conducted in which 60 ppm of the sequesterant were dissolved in 100 ml. of water. The pH was adjusted to 9 and maintained there. Metal cations were added in the following amounts, before a noticeable precipitate was formed.

TABLE III

| Sequesterant | Metal (ppm) Sequestered per 60 ppm of Sequesterant | |
|---|---|---|
| Product | | |
| Example 1 | $Fe^{+3}$ | (70) |
| Example 1 | $Al^{+3}$ | (120) |
| Example 1 | $Cu^{+2}$ | (120) |
| Example 1 | $Ni^{+2}$ | (60) |
| Example 2 | $Fe^{+3}$ | (60) |
| Example 2 | $Al^{+3}$ | (70) |
| Example 2 | $Cu^{+2}$ | (70) |
| Example 2 | $Ni^{+3}$ | (50) |

Other heavy metals sequestered by the sequestering agents of this invention such as cobalt, mangenese, chromium and the like.

The amount employed to chelate is controlled by stoichiometry in contrast to scale inhibition where the amount employed is threshold or less than stoichiometric.

In summary, the products of this invention are phosphomethylolated polymerized polyalkylenepolyamines. Polymerizing agents or chain extenders for the PAP are epoxyhalides, or dihalides such as epihalohydrin such as epichlorohydrin, dihalides such as alkylene dihalides such as those of the formula X—Z—X where X is halogen and Z is alkylene, alkenylene, alkinylene, xylylene, alkylene ether-contains, etc. The phosphomethylolated groups. i.e., $$-CH_2\overset{\overset{\displaystyle O}{\|}}{P}-(OH)_2$$

(or salts thereof) are substituted for at least 50% such as at least 75% but preferably 90-100% of the available nitrogen-bonded hydrogens on the polymerized polyalkylenepolyamine. The preferred polyalkylenepolyamines employed are those of the formula $$NH_2(A\overset{\displaystyle H}{N})_{1-10}H$$

where A is alkylene, preferably ethylene or propylene or commercial mixtures containing such polyalkylenepolyamines (PAP).

These compositions are employed as scale inhibitors, chelating agents, and the like. They are particularly useful as metal ion sequestrants and threshold scale inhibitors as well as having desirable surface active properties. They also have the property of being water soluble or dispersible as well as being soluble in organic solvents. The compounds of this invention can also find utility in such fields as water treating agents, detergents, metal cleaning, corrosion inhibitors, emulsifiers, breaking or preventing petroleum emulsions, oil additives, gasoline additives, lubricants, and the like.

I claim:

1. A process of inhibiting scale in a commercial water system containing as scale forming compounds calcium, barium and magnesium carbonate, sulfate, silicate, oxalate, phosphate, hydroxide or fluoride which comprises adding to said system an effective amount of a methylene phosphonate polymer selected from the group consisting of soluble or dispersible polyalkylenepolyamine-epihalohydrin polymers and polyalkylenepolyamine-dihalide compound polymers, said dihalide compound being an alkylene ether dihalide compound or an unsaturated dihalide, said methylene phosphonate polymer having nitrogen-bonded methylene phosphonate units of the formula $$-CH_2PO(OM)_2$$

where M is alkali metal, alkaline earth metal, hydrogen, alkyl ammonium or ammonium, the terminal nitrogen atoms of said methylene phosphonate polymers having no more than one methylene phosphonate group attached thereto, the remaining valence of the terminal nitrogen atom having attached thereto the group $$-CH_2-\underset{\underset{\displaystyle OH}{|}}{CH}-CH_2-,$$

a divalent aliphatic ether radical, or a divalent unsaturated aliphatic radical.

2. The process of claim 1 wherein the methylene phosphonate polymer is a polyalkylenepolyamine-epihalohydrin polymer.

3. The process of claim 1 where the methylene phosphonate polymer is a polyalkylenepolyamine-dihalide polymer.

4. The process of claim 2 where the polymer has repeating units of the idealized formula

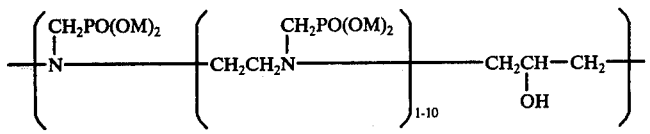

5. The process of claim 3 where the polymer has repeating units of the idealized formula

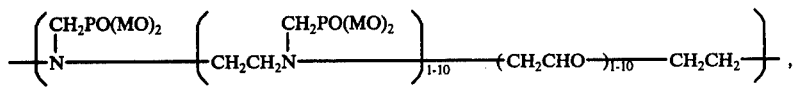

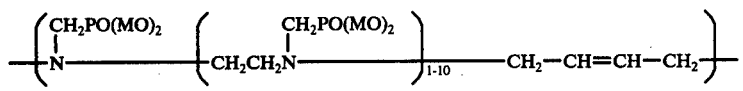

or

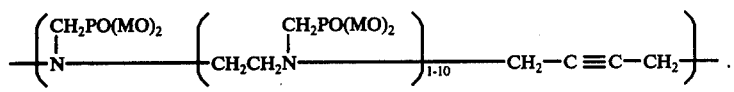

6. The process of claim 1 where the polymer is one having controlled crosslinking so that it is soluble in, dispersible in or soluble or dispersible in an aqueous medium.

7. A process of chelating metal cations, including ferrous cations, from aqueous systems which comprises adding to said aqueous system an effective amount of a methylene phosphonate polymer selected from the group consisting of soluble or dispersible polyalkyleneamine-epihalohydrin polymers and polyalkyleneamine-dihalide compound polymers, said dihalide compound being an alkylene ether dihalide compound or an unsaturated dihalide, said methylene phosphonate polymer having nitrogen-bonded methylene phosphonate units of the formula —CH$_2$PO(MO)$_2$ 

where M is alkali metal, alkaline earth metal, hydrogen alkyl ammonium or ammonium, the terminal nitrogen atoms of said methylene phosphonate polymers having no more than one methylene phosphonate group attached thereto, the remaining valence of the terminal nitrogen atom having attached thereto the group ,02/0380

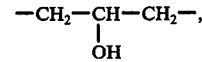

a divalent aliphatic ether radical, or a divalent unsaturated aliphatic radical.

8. The process of claim 7 where the methylene phosphonate polymer is a polyalkylaminepolyamine-epihalohydrin polymer.

9. The process of claim 7 where the methylene phosphonate polymer is a polyalkylenepolyamine-dihalide polymer.

10. The process of claim 8 where the polymer has repeating units of the idealized formula

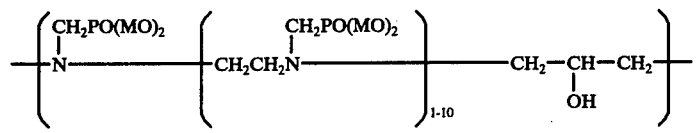

11. The process of claim 9 where the polymer has repeating units of the idealized formula ,02/0401

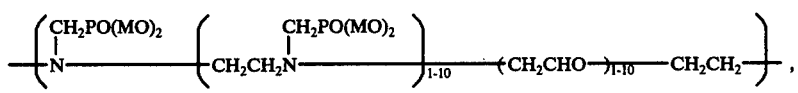

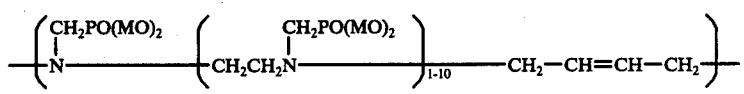

or

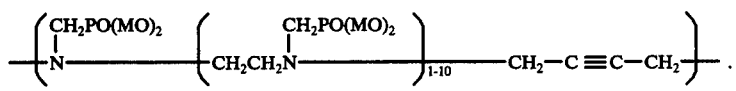

12. The process of claim 7 where the polymer is one having controlled crosslinking so that it is soluble in, dispersible in or soluble and dispersible in an aqueous medium.

* * * * *